United States Patent
Kojima et al.

(10) Patent No.: US 7,954,479 B2
(45) Date of Patent: Jun. 7, 2011

(54) FUEL SUPPLY DEVICE FOR GAS ENGINE

(75) Inventors: Hiroaki Kojima, Saitama (JP);
Masanori Fujinuma, Saitama (JP);
Yasuhiro Sugimoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 265 days.

(21) Appl. No.: 12/302,341

(22) PCT Filed: May 29, 2006

(86) PCT No.: PCT/JP2006/310650
§ 371 (c)(1),
(2), (4) Date: Nov. 25, 2008

(87) PCT Pub. No.: WO2007/138667
PCT Pub. Date: Dec. 6, 2007

(65) Prior Publication Data
US 2009/0183716 A1    Jul. 23, 2009

(51) Int. Cl.
*F02B 13/00* (2006.01)
*F02B 13/10* (2006.01)
(52) U.S. Cl. ........................................ 123/575; 123/511
(58) Field of Classification Search .................. 123/575, 123/576–578, 299, 300, 304, 1 A, 27 GE, 123/511
See application file for complete search history.

(56) References Cited

U.S. PATENT DOCUMENTS

| | | | |
|---|---|---|---|
| 4,513,727 A | 4/1985 | Lagano et al. | 123/525 |
| 4,535,728 A | 8/1985 | Batchelor | 123/27 GE |
| 6,845,608 B2 | 1/2005 | Klenk et al. | 60/274 |
| 2002/0134362 A1 | 9/2002 | Deutsch | 123/575 |

FOREIGN PATENT DOCUMENTS

| | | |
|---|---|---|
| JP | 5-156974 A | 6/1993 |
| JP | 2003-293809 A | 10/2003 |
| JP | 2005-330867 A | 12/2005 |
| JP | 2006-112283 A | 4/2006 |

*Primary Examiner* — Mahmoud Gimie
(74) *Attorney, Agent, or Firm* — Arent Fox LLP

(57) ABSTRACT

A fuel supply device for a gas engine is provided that includes a vaporizer, a primary regulator, a fuel changeover valve, a second inlet passage to which is introduced a second fuel fed out from a second fuel source, and a common outlet passage and can selectively connect the first and second inlet passages to the outlet passage, a common secondary regulator that regulates the pressure of the first fuel or second fuel so that it is at substantially atmospheric pressure and supplies it to a mixer, and a cutoff valve that opens/closes a fuel passage between the fuel changeover valve and the secondary regulator in response to operation/stopping of a gas engine, the vaporizer, the primary regulator, the fuel changeover valve, the cutoff valve, and the secondary regulator being integrally connected to each other to form a unit.

10 Claims, 4 Drawing Sheets ved entry of International
FUEL SUPPLY DEVICE FOR GAS ENGINE

CROSS-REFERENCE TO RELATED APPLICATION

This application is a National Stage entry of International Application No. PCT/JP2006/310650, filed May 29, 2006. The disclosure of the prior application is hereby incorporated herein in its entirety by reference.

TECHNICAL FIELD

The present invention relates to a fuel supply device for a gas engine that can selectively supply to a gas engine two types of gas fuel having different properties.

BACKGROUND ART

Such a fuel supply device for a gas engine is already known, as disclosed in Patent Publication 1.
Patent Publication 1: Japanese Patent Application Laid-open No. 5-156974

DISCLOSURE OF INVENTION

Problems to be Solved by the Invention

In the fuel supply device for a gas engine disclosed in Patent Publication 1 above, since fuel pipes are used to provide connections between a plurality of regulators, a fuel changeover valve, a cutoff valve, etc., that form the fuel supply device, a large number of piping-related components are necessary, the number of steps in assembling the components is accordingly high, it is difficult to reduce the cost, the device increases in size, and it is necessary to ensure that there is a large space for installing the device.

The present invention has been accomplished in the light of such circumstances, and it is an object thereof to provide a fuel supply device for a gas engine, the fuel supply device eliminating the necessity for the piping of fuel pipes between each of a regulator, a fuel changeover valve, a cutoff valve, etc., and being inexpensive and compact.

Means for Solving the Problems

In order to attain the above object, according to a first aspect of the present invention, there is provided a fuel supply device for a gas engine, the fuel supply device comprising a vaporizer that gasifies a first fuel introduced from a first fuel source, a primary regulator that pressure-regulates the first fuel, which is in a gaseous state, introduced from the vaporizer, a fuel changeover valve that has a first inlet passage to which is introduced the gaseous first fuel fed out from the primary regulator, a second inlet passage to which is introduced a gaseous second fuel fed out from a second fuel source, and a common outlet passage and can selectively connect the first and second inlet passages to the outlet passage, a common secondary regulator that regulates the pressure of the gaseous first fuel or second fuel fed out from the outlet passage of the fuel changeover valve so as to be at substantially atmospheric pressure and supplies the fuel to a mixer of a gas engine, and a cutoff valve that opens/closes a fuel passage between the fuel changeover valve and the secondary regulator in response to operation/stopping of the gas engine, the vaporizer, the primary regulator, the fuel changeover valve, the cutoff valve, and the secondary regulator being integrally connected to each other to form a unit.

According to a second aspect of the present invention, in addition to the first aspect, connecting parts between the cutoff valve and primary regulator and the fuel changeover valve are made detachable, and when the fuel changeover valve is detached from the cutoff valve and the primary regulator, the primary regulator and the second fuel pipe connected to the second fuel source can selectively be connected to the cutoff valve.

According to a third aspect of the present invention, in addition to the first or second aspect, a first module is formed from the vaporizer and the primary regulator.

According to a fourth aspect of the present invention, in addition to the first or second aspect, a second module is formed from the cutoff valve and the secondary regulator.

According to a fifth aspect of the present invention, in addition to any one of the first to third aspects, the vaporizer is provided with a heater for heating fuel.

EFFECTS OF THE INVENTION

In accordance with the first aspect of the present invention, when the fuel changeover valve is set so as to provide a connection between the first inlet passage and the outlet passage, the first fuel fed out from the first fuel source is gasified in the vaporizer, is pressure-regulated by the primary regulator, and goes toward the cutoff valve via the fuel changeover valve. When the gas engine is started at this point, since the cutoff valve opens in response thereto, the first fuel that has passed through the fuel changeover valve is pressure-regulated so that it is at substantially atmospheric pressure by the secondary regulator, and supplied to the gas engine. Furthermore, when the fuel changeover valve is switched so as to provide a connection between the second inlet passage and the outlet passage, the second fuel fed out from the second fuel source goes toward the cutoff valve via the fuel changeover valve. When the gas engine is started at this point, since the cutoff valve opens in response thereto, the second fuel that has passed through the cutoff valve is pressure-regulated so that it is at substantially atmospheric pressure by the secondary regulator and supplied to the gas engine. Since the secondary regulator exhibits a pressure-regulating function in common for either the first fuel or the second fuel, only one thereof is required, thus contributing to simplification of the device.

Moreover, since the vaporizer, the primary regulator, the fuel changeover valve, the cutoff valve, and the secondary regulator are integrally connected to each other to form a unit, it is possible to make piping between these components unnecessary and to reduce the number of assembly steps and, together with it being sufficient to use only one secondary regulator, the cost can be reduced and the device can be made compact.

Furthermore, in accordance with the second aspect of the present invention, it is possible to form a changeover type fuel supply device that selectively supplies to the gas engine the first fuel or the second fuel by connecting the fuel changeover valve to the cutoff valve and the primary regulator, it is also possible to form a supply device exclusively used with the first fuel for exclusively supplying the first fuel to the gas engine by separating the switch valve from the cutoff valve and the primary regulator and directly connecting the primary regulator to the cutoff valve, and it is also possible to form a supply device exclusively used with the second fuel for exclusively supplying the second fuel to the gas engine by directly connecting the second fuel pipe to the cutoff valve. Therefore, in the above-mentioned three types of fuel supply devices, there is much common equipment, the mass-productivity improves, and a reduction in cost can be expected.

Moreover, in accordance with the third aspect of the present invention, since the first module is formed from the vaporizer and the primary regulator, it is possible to simply carry out assembly of the changeover type fuel supply device, the supply device exclusively used for the first fuel, the supply device exclusively used for the second fuel, etc.

Furthermore, in accordance with the fourth aspect of the present invention, since the second module is formed from the cutoff valve and the secondary regulator, it is possible to simply carry out assembly of the changeover type fuel supply device, the first fuel supply device, the second fuel supply device, etc.

Moreover, in accordance with the fifth aspect of the present invention, it is possible to carry out effectively vaporization of the first fuel introduced in a liquid state from the first fuel source to the vaporizer by heating using the heater.

EXPLANATION OF REFERENCE NUMERALS AND SYMBOLS

Figure 1:
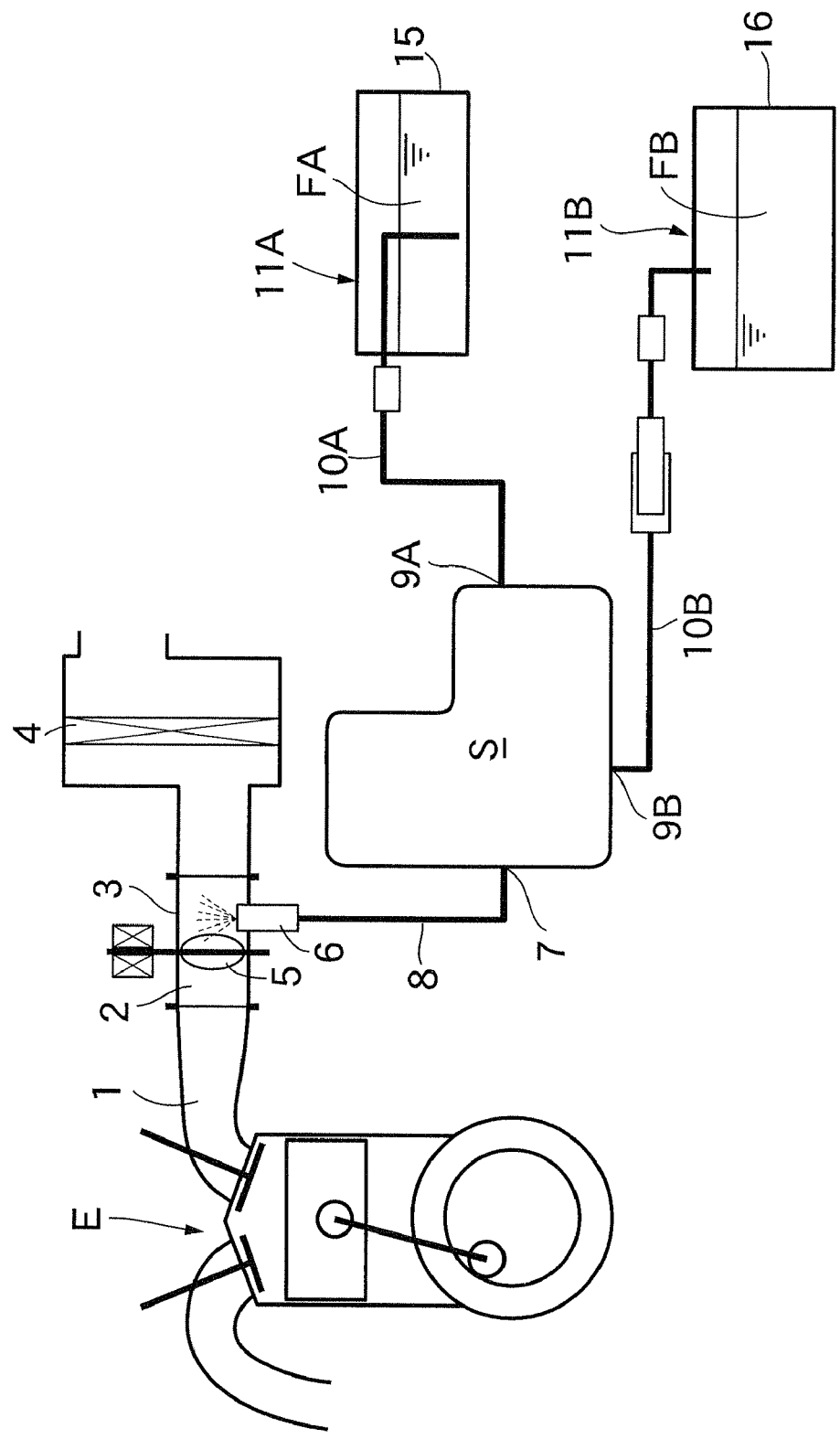
FIG. 1 is a fuel supply schematic diagram of a gas engine equipped with the fuel supply device of the present invention (first embodiment).

E Gas engine
FA First fuel (butane gas)
FB Second fuel (propane gas)
S Fuel supply device for gas engine
3 Mixer
7 Fuel outlet
8 Supply pipe
9A First fuel inlet
9B Second fuel inlet
11A First fuel source
11B Second fuel source
17 Vaporizer
18 Primary regulator
19 Fuel changeover valve
20 Cutoff valve
21 Secondary regulator
23 Heater
31 First module
32 Second module

BEST MODE FOR CARRYING OUT THE INVENTION

A mode for carrying out the present invention is explained below by reference to a preferred embodiment of the present invention shown in the attached drawings.

Embodiment 1

The mixer 3 is provided with a throttle valve 5 for opening and closing the intake passage 2, and a fuel nozzle 6 opening in the intake passage 2 on the upstream side of the throttle valve 5, and a supply pipe 8 is connected to the fuel nozzle 6, the supply pipe 8 extending from one fuel outlet 7 of a fuel supply device S related to the present invention. Furthermore, the fuel supply device S includes a pair of first and second fuel inlets 9A and 9B, to which are connected respectively first and second fuel pipes 10A and 10B extending from a first fuel source 11A and a second fuel source 11B, the fuel supply device S selectively taking in one of a first fuel FA of the first fuel source 11A and a second fuel FB of the second fuel source 11B, regulating the pressure, and supplying it to the mixer 3. The first fuel source 11A is formed from a cassette type small cylinder 15 filled with the first fuel FA, for example, butane gas, and the second fuel source 11B is formed from a large cylinder 16 filled with, for example, propane gas.

The fuel supply device S is explained in detail by reference to FIG. 2.

The fuel supply device S is formed from a vaporizer 17, a primary regulator 18, a fuel changeover valve 19, a cutoff valve 20, a secondary regulator 21, and a jet changeover valve 22.

The vaporizer 17 includes the first fuel inlet 9A on one side, and the first fuel pipe 10A is connected thereto. The vaporizer 17 gasifies the first fuel FA, which is in a liquid state, fed out from the first fuel source 11A through the first fuel pipe 10A, and includes an electric heater 23 for heating the first fuel FA in order to promote gasification thereof.

Pairs of first connecting parts 26 and 26 are formed on opposing end parts of the vaporizer 17 and the primary regulator 18, and connecting the first connecting parts 26 and 26 to each other by bolts forms a first module 31 in which fuel passages within the vaporizer 17 and the primary regulator 18 communicate with each other. In the primary regulator 18, the pressure of the first fuel FA gasified by the vaporizer 17 is reduced to a predetermined pressure.

Pairs of second connecting parts 27 and 27 are formed on opposing end parts of the cutoff valve 20 and the secondary regulator 21, and detachably connecting the second connecting parts 27 and 27 to each other by bolts forms a second module 32 in which fuel passages within the cutoff valve 20 and the secondary regulator 21 communicate with each other. The cutoff valve 20 has a negative pressure introducing part 36 that communicates with a negative pressure generating section 35 such as a crank chamber or an intake port when the gas engine E is operated, and the cutoff valve 20 opens when negative pressure is introduced into the negative pressure introduction part 36, thus giving continuity to the fuel passage therewithin. That is, it opens and closes in response to operation and stopping of the gas engine E, thus opening and closing the fuel passage therewithin. The secondary regulator 21 regulates the pressure of the first fuel FA, which is in a gaseous state, fed out from the cutoff valve 20 so that it is at substantially atmospheric pressure.

The fuel changeover valve 19 and the jet changeover valve 22 are mounted on a common base plate 37, thus forming a third module 33. Pairs of third connecting parts 28 and 28 are formed on opposing end parts of the common base plate 37 and the primary regulator 18, and these third connecting parts 28 and 28 are detachably joined to each other by bolts, thereby connecting fuel passages within the fuel changeover valve 19 and the primary regulator 18.

Pairs of fourth connecting parts 29 and 29 are formed on opposing end parts of a common base plate 37 and the cutoff valve 20 and secondary regulator 21; detachably joining the fourth connecting parts 29 and 29 to each other by bolts connects fuel passages within the fuel changeover valve 19 and the cutoff valve 20, and at the same time connects fuel passages within the secondary regulator 21 and the jet changeover valve 22.

The common base plate 37 is provided with the second fuel inlet 9B on a side face opposite to the cutoff valve 20 and with the fuel outlet 7 on a side opposite to the primary regulator 18, the second fuel pipe 10B extending from the second fuel source 11B is connected to the second fuel inlet 9B, and the supply pipe 8 communicating with the fuel nozzle 6 is connected to the fuel outlet 7.

The fuel changeover valve 19 includes a tap 42 having a first inlet passage 40A communicating with the primary regulator 18, a second inlet passage 40B communicating with the second fuel inlet 9B, and an outlet passage 41 communicating with the cutoff valve 20, and selecting one of the first and second inlet passages 40A and 40B so as to connect it to the outlet passage 41.

The jet changeover valve 22 includes a first jet 44A and a second jet 44B, that is, a pair, having their exit sides communicating with the fuel outlet 7, and a tap 47 having a first outlet passage 45A communicating with an inlet of the first jet 44A, a second outlet passage 45B communicating with an inlet of the second jet 44B, and an inlet passage 46 communicating with the primary regulator 18, and selecting one of the first and second outlet passages 45A and 45B so as to connect it to the inlet passage 46. Mounted on the common base plate 37 is a single operating lever 48 that can simultaneously switch the tap 42 of the fuel changeover valve 19 and the tap 47 of the jet changeover valve 22. In other words, the two taps 42 and 47 are operatively connected via the operating lever 48, and when the first inlet passage 40A or the second inlet passage 40B is connected to the outlet passage 41 by the tap 42 in the fuel changeover valve 19, in the jet changeover valve 22 the first outlet passage 45A or the second outlet passage 45B is connected to the inlet passage 46.

As described above, the vaporizer 17, the primary regulator 18, the fuel changeover valve 19, the cutoff valve 20, the secondary regulator 21, and the jet changeover valve 22 are integrally connected to each other to form a unit.

The operation of this embodiment is now explained.

[Changeover Type Fuel Supply Device Mode]

Figure 2:
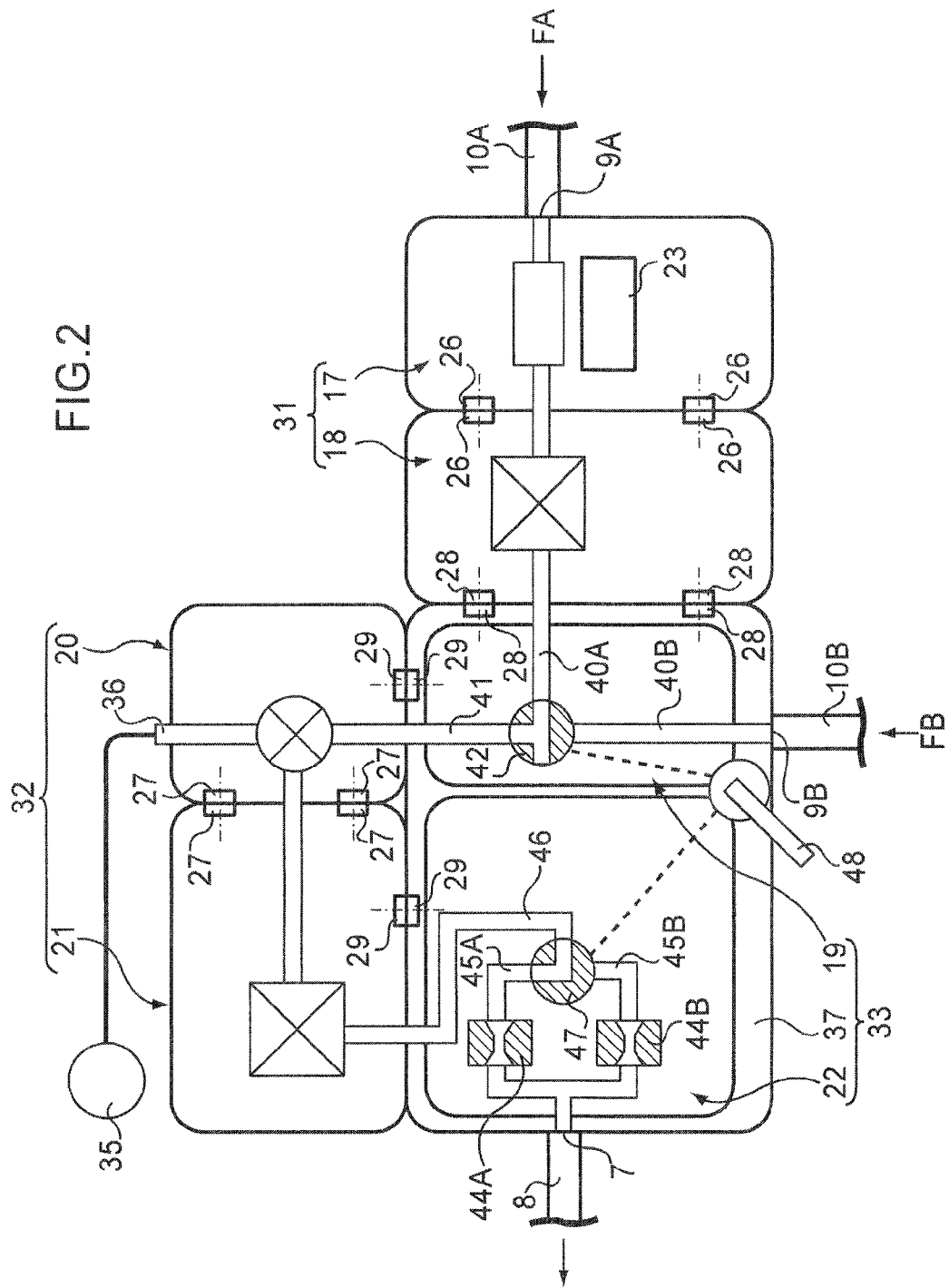
FIG. 2 is an enlarged side view in which each functional module of the fuel supply device is represented as a model (first embodiment).

As shown in FIG. 2, the vaporizer 17, the primary regulator 18, the fuel changeover valve 19, the cutoff valve 20, the secondary regulator 21, and the jet changeover valve 22 are integrally connected to each other to form a unit, thus forming the fuel supply device S, which is of a changeover type. In this arrangement, since the first module 31 is formed from the vaporizer 17 and the primary regulator 18, the second module 32 is formed from the cutoff valve 20 and the secondary regulator 21, and the third module 33 is formed from the fuel changeover valve 19 and the jet changeover valve 22, when the changeover type fuel supply device S is formed, it can easily be formed by connecting the three modules 31 to 33, and the ease of assembly is very good. By providing a connection between the first inlet passage 40A and the outlet passage 41 with the fuel changeover valve 19, the jet changeover valve 22, which is operatively connected thereto, provides a connection between the inlet passage 46 and the first outlet passage 45A. As a result, the first fuel FA fed out from the first fuel source 11A is introduced into the vaporizer 17 via the first fuel pipe 10A, is gasified, is then pressure-regulated by the primary regulator 18, and goes toward the cutoff valve 20 via the fuel changeover valve 19. When the gas engine E is started at this point, the cutoff valve 20 is opened in response thereto, the first fuel FA that has passed through the cutoff valve 20 is pressure-regulated by the secondary regulator 21 so that it is at substantially atmospheric pressure, then guided to the first jet 44A side by the jet changeover valve 22, regulated so as to have an appropriate flow rate corresponding to the first fuel FA by the first jet 44A, and supplied to the fuel nozzle 6 of the mixer 3 via the supply pipe 8. In the intake passage 2 of the mixer 3, a gas mixture of fuel sprayed from the fuel nozzle 6 and air filtered by the air cleaner 4 is formed, and this is taken into the gas engine E while the flow rate thereof is controlled by the throttle valve 5. Therefore, the gas engine E can be run continuously with the first fuel FA in a gaseous state.

Subsequently, by changing over the fuel changeover valve 19 to the side in which the second inlet passage 40B and the outlet passage 41 are connected, the jet changeover valve 22, which is operatively connected thereto, provides a connection between the inlet passage 46 and the second outlet passage 45B. As a result, this time the second fuel FB fed out from the second fuel source 11B goes immediately toward the cutoff valve 20 via the second fuel pipe 10B. After the second fuel FB that has passed through the cutoff valve 20 is pressure-regulated by the secondary regulator 21 so that it is at substantially atmospheric pressure, it is guided toward the second jet 44B side by the jet changeover valve 22, and supplied to the mixer 3 of the gas engine E while being regulated so as to have an appropriate flow rate corresponding to the second fuel FB by the second jet 44B. Therefore, the gas engine E can be run continuously with the first second fuel FB in a gaseous state.

As is clear from the above, since the secondary regulator 21 exhibits a pressure-regulating function in common for either of the first fuel FA and the first second fuel FB, only one thereof is required, thus contributing to simplification of the fuel supply device S. Moreover, the vaporizer 17, the primary regulator 18, the fuel changeover valve 19, the cutoff valve 20, and the secondary regulator 21 are integrally connected to each other to form a unit, it is possible to make piping between these components unnecessary and to reduce the number of assembly steps and, together with it being sufficient to use only one secondary regulator 21, the cost can be reduced and the device can be made compact.

[Mode in which Fuel Supply Device is Exclusively Used for First Fuel]

Figure 3:
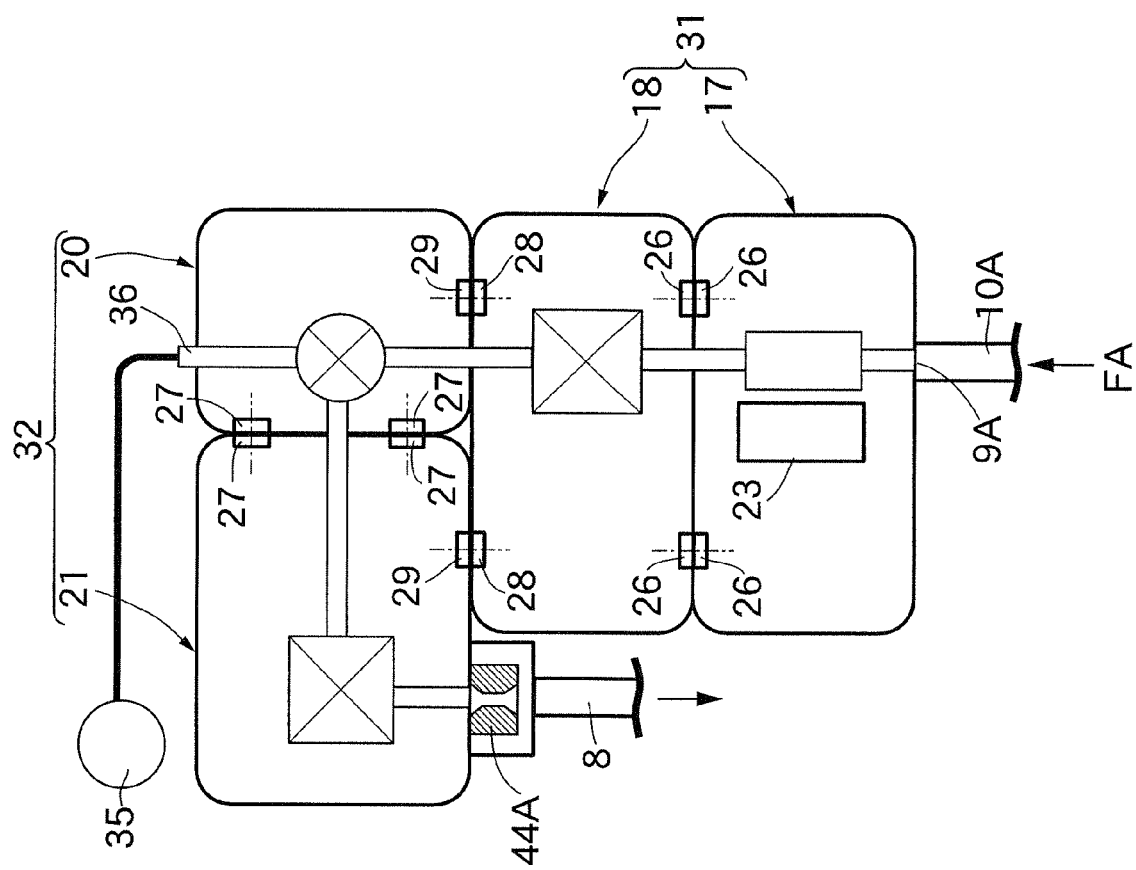
FIG. 3 is a side view showing a mode in which a supply device exclusively used for a first fuel is formed by utilizing part of the fuel supply device (first embodiment).
Figure 4:
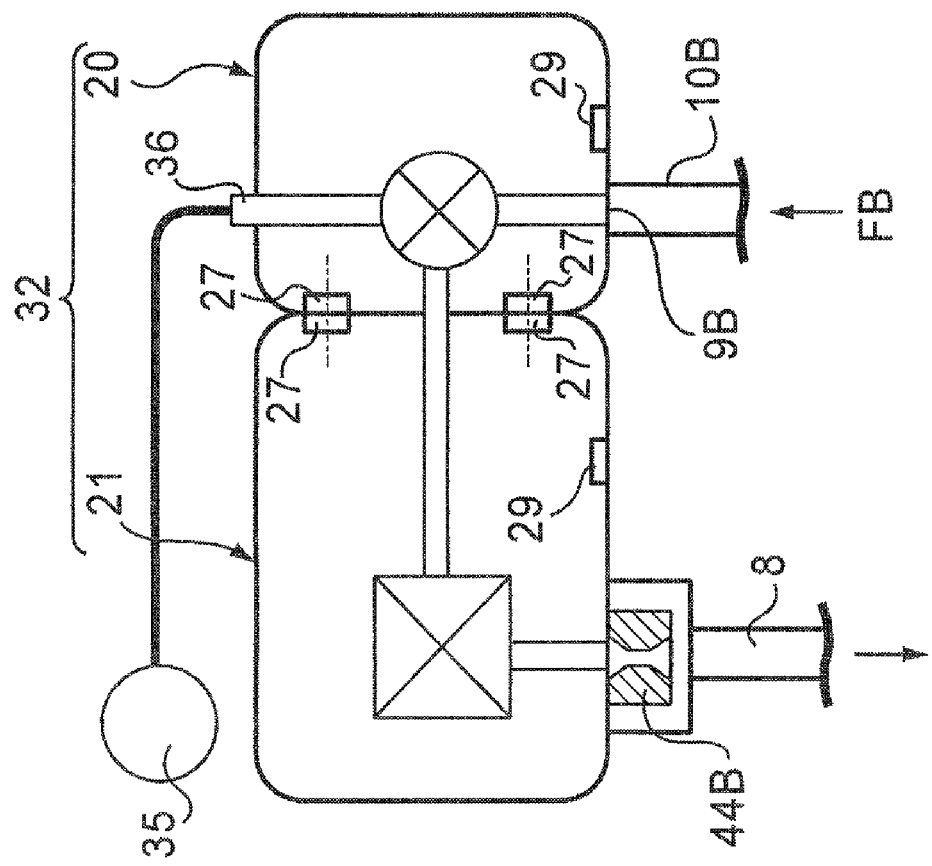
FIG. 4 is a side view showing a mode in which a supply device exclusively used for a second fuel is formed by utilizing part of the fuel supply device (first embodiment).

As shown in FIG. 3, the first module 31 and the second module 32, that is, the second connecting parts 28 of the first module 31 and the fourth connecting parts 29 of the second module 32, are directly connected to each other by bolts. By so doing, a passage of the primary regulator 18 and a passage of the cutoff valve 20 are automatically connected. The supply pipe 8 is connected to an open exit of the secondary regulator 21 via the first jet 44A, which is exclusively used therefor.

The first fuel FA fed out from the first fuel source 11A is guided to the vaporizer 17 via the first fuel pipe 10A and gasified, is subsequently pressure-regulated by the primary regulator 18, and then goes directly toward the cutoff valve 20. Since, when the gas engine E is started at this point, the cutoff valve 20 is opened in response thereto, the first fuel FA that has passed through the cutoff valve 20 is pressure-regulated by the secondary regulator 21 so that it is at substantially atmospheric pressure, and then supplied to the fuel nozzle 6 of the mixer 3 via the first jet 44A and the supply pipe 8. Therefore, the fuel supply device with this mode exclusively supplies the first fuel FA to the gas engine E.

When assembling a fuel supply device with such a mode, connecting the first module 31 formed from the vaporizer 17 and the primary regulator 18 to the second module 32 formed from the cutoff valve 20 and the secondary regulator 21 enables assembly to be carried out simply and quickly, and the ease of assembly is thus good.

The second fuel FB, which is in a gaseous state, fed out from the second fuel source 11B immediately goes toward the cutoff valve 20 via the second fuel pipe 10B. Since, when the gas engine E is started at this point, the cutoff valve 20 is opened in response thereto, the second fuel FB that has passed through the cutoff valve 20 is pressure-regulated by the secondary regulator 21 so that it is at substantially atmospheric pressure, and then supplied to the fuel nozzle 6 of the mixer 3 via the second jet 44B and the supply pipe 8. Therefore, the fuel supply device with this mode exclusively supplies the second fuel FB to the gas engine E.

As is clear from the above, in the changeover type fuel supply device S for a gas engine, selectively combining components enables different types of fuel supply devices such as one exclusively used for the first fuel and one exclusively used for the second fuel to be formed, and as a result, with regard to these three types of fuel supply devices, there is much common equipment, the mass-productivity improves, and a reduction in cost can be expected.

The present invention is not limited to the above-mentioned embodiment, and may be modified in a variety of ways as long as the modifications do not depart from the spirit and scope thereof. For example, the first module 31 may be formed by inseparably joining the vaporizer 17 and the primary regulator 18 as a unit, and the second module 32 may also be formed by inseparably joining the cutoff valve 20 and the secondary regulator 21 as a unit.

The invention claimed is:

1. A fuel supply device for a gas engine, the fuel supply device comprising a vaporizer that gasifies a first fuel introduced from a first fuel source, a primary regulator that pressure-regulates the first fuel, which is in a gaseous state, introduced from the vaporizer, a fuel changeover valve that has a first inlet passage to which is introduced the gaseous first fuel fed out from the primary regulator, a second inlet passage to which is introduced a gaseous second fuel fed out from a second fuel source and a common outlet passage and can selectively connect the first and second inlet passages to the outlet passage, a common secondary regulator that regulates the pressure of the gaseous first fuel or second fuel fed out from the outlet passage of the fuel changeover valve so as to be at substantially atmospheric pressure and supplies the fuel to a mixer of a gas engine, and a cutoff valve that opens/closes a fuel passage between the fuel changeover valve and the secondary regulator in response to operation/stopping of the gas engine, the vaporizer, the primary regulator, the fuel changeover valve, the cutoff valve, and the secondary regulator being integrally connected to each other to form a unit.

2. The fuel supply device for a gas engine according to claim 1, wherein connecting parts between the cutoff valve and primary regulator and the fuel changeover valve are made detachable, and when the fuel changeover valve is detached from the cutoff valve and the primary regulator, the primary regulator and the second fuel pipe connected to the second fuel source can selectively be connected to the cutoff valve.

3. The fuel supply device for a gas engine according to claim 1, wherein a first module is formed from the vaporizer and the primary regulator.

4. The fuel supply device for a gas engine according to claim 1, wherein a second module is formed from the cutoff valve and the secondary regulator.

5. The fuel supply device for a gas engine according to claim 1, wherein the vaporizer is provided with a heater for heating fuel.

6. The fuel supply device for a gas engine according to claim 2, wherein a first module is formed from the vaporizer and the primary regulator.

7. The fuel supply device for a gas engine according to claim 2, wherein a second module is formed from the cutoff valve and the secondary regulator.

8. The fuel supply device for a gas engine according to claim 2, wherein the vaporizer is provided with a heater for heating fuel.

9. The fuel supply device for a gas engine according to claim 3, wherein the vaporizer is provided with a heater for heating fuel.

10. The fuel supply device for a gas engine according to claim 6, wherein the vaporizer is provided with a heater for heating fuel.

* * * * *